Oct. 5, 1954 W. R. BECK 2,690,884
CABLE GUIDE
Filed March 7, 1952 5 Sheets-Sheet 1

Inventor
William R. Beck
By Murray G. Gleeson
Attorney

Oct. 5, 1954   W. R. BECK   2,690,884
CABLE GUIDE
Filed March 7, 1952   5 Sheets-Sheet 2

Inventor
William R. Beck
By Murray A. Gleeson
Attorney

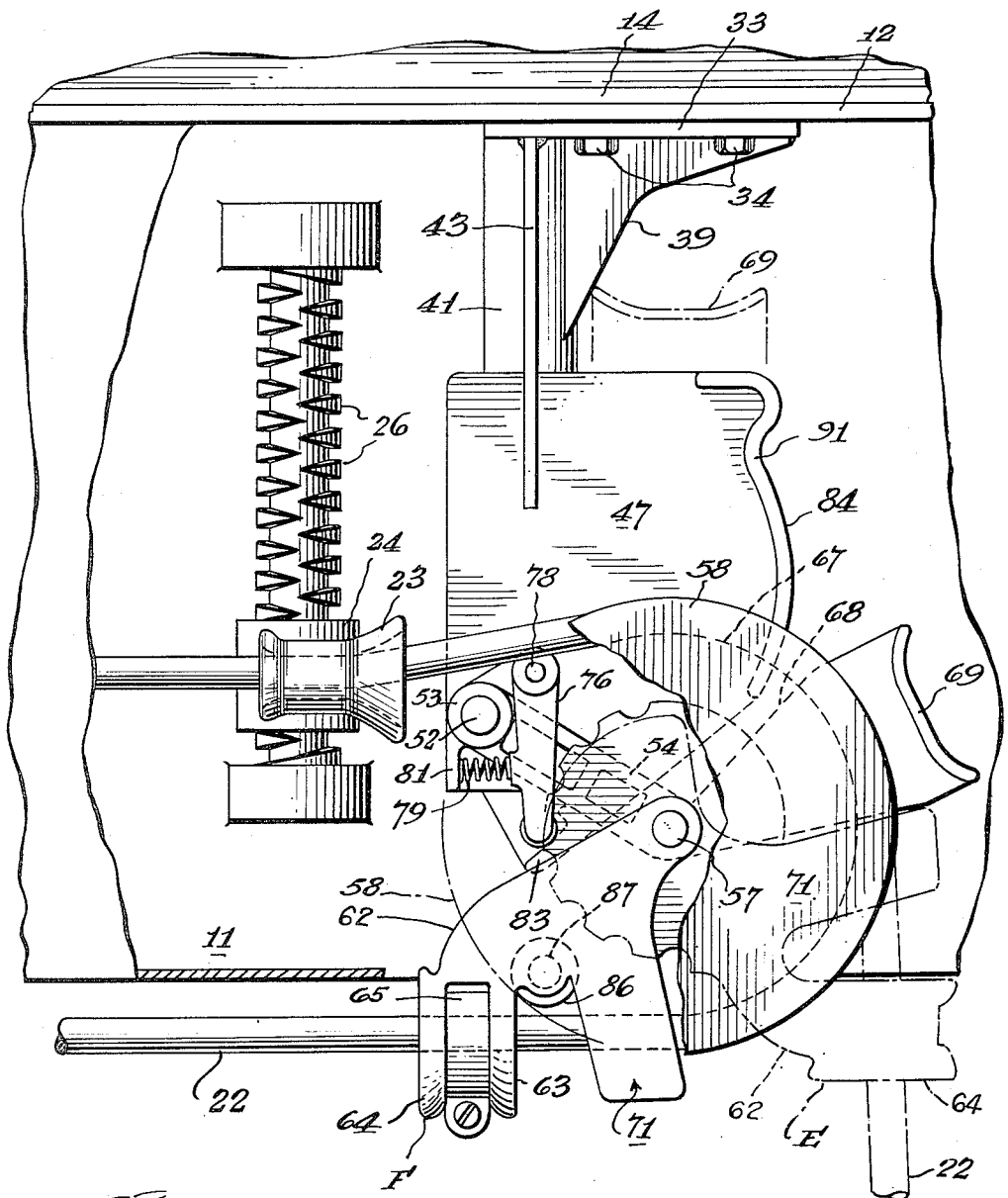

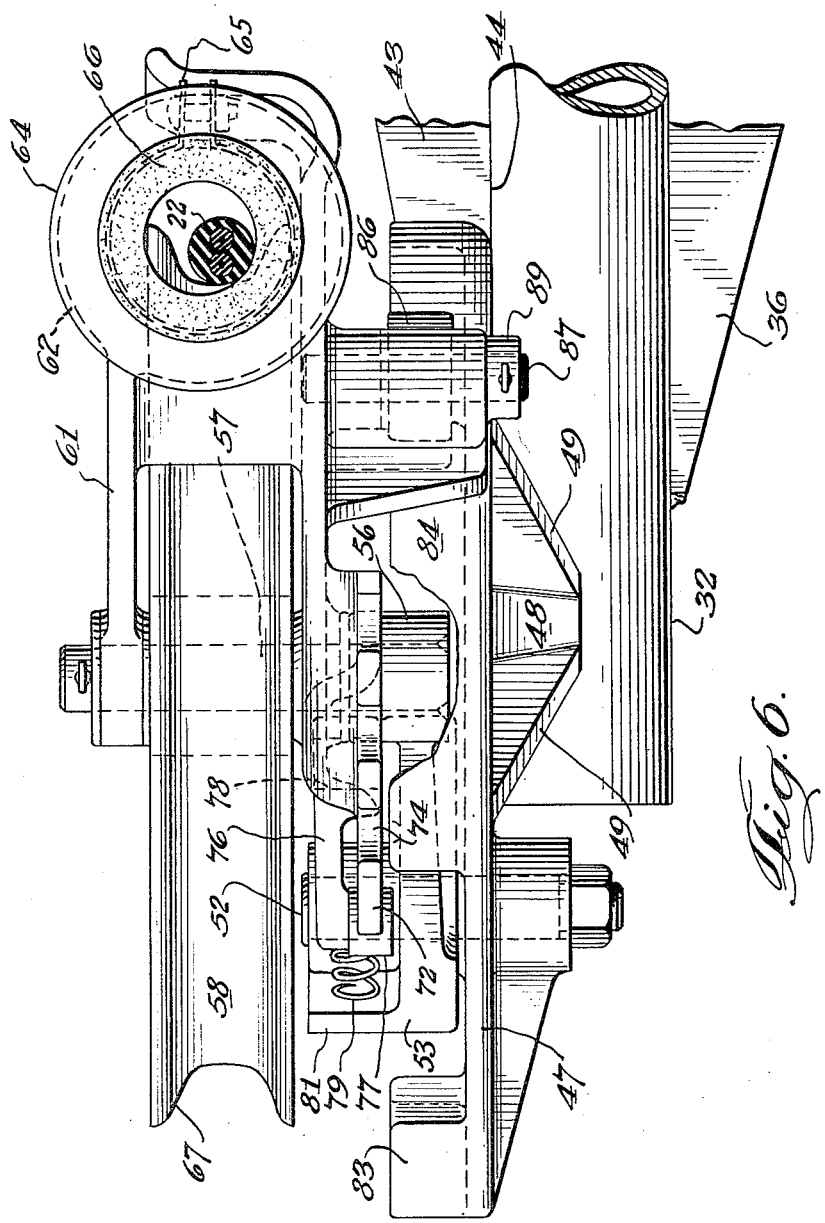

Patented Oct. 5, 1954

2,690,884

UNITED STATES PATENT OFFICE 2,690,884

CABLE GUIDE

William R. Beck, Chicago, Ill., assignor to Goodman Manufacturing Company, Chicago, Ill., a corporation of Illinois Application March 7, 1952, Serial No. 275,355

12 Claims. (Cl. 242—92)

This invention relates to guides for the power supply cable of a mine vehicle or the like.

This application represents an improvement over that shown in my co-pending application Serial No. 131,843, filed December 8, 1949, now Patent No. 2,633,309, issued March 31, 1953.

Certain types of mine vehicles, of which shuttle cars are an example, are supplied with power from a fixed point or junction box, a cable being connected to the junction box at one end and to the vehicle at the other end. Such vehicles are provided with cable reels for taking up the cable or paying out same as the vehicle moves with respect to the junction box. As the vehicle moves past the junction box, the power supply cable must change its direction of lay with respect to the vehicle, that is to say, it must be taken up over the end of the vehicle as it approaches the junction box, and then payed out alongside thereof, clear of the wheels and vehicle frame, as the vehicle moves away from the junction box. In the other direction of operation, of course, the cable is taken up from alongside the vehicle as it moves toward the junction box, and is payed out as it moves away.

The cable reel mechanism generally includes a spooler in the form of a double lead screw which insures the cable being substantially layer wound upon the cable reel. Heretofore a fixed idler sheave has been interposed between the cable guide and the spooler to insure that the travel of the spooler carriage on the spooler had no effect upon the positioning of the cable guide.

In carrying out the present invention, however, the cable guide is made capable of movement with respect to the car in accordance with the shift in position of the spooler carriage so that a fixed idler sheave is made unnecessary. The cable guide at the same time is so arranged as properly to lay the cable alongside the car or over the end of the car under conditions as above described irrespective of the position of the spooler carriage on the spooler.

Accordingly, the cable guide sheave is mounted at the end of a short swinging arm arranged to swing in accordance with the position of the spooler carriage and the position of the cable with respect to the car, that is, along the side or over the end thereof. The cable is arranged to be held in contact with the cable guide sheave by a hold down member movable with a cable guide eye located on the end of an arm swingable with respect to the short swinging arm supporting the cable guide sheave, and by a cable support arm movable with the short swinging arm. The arm supporting the cable guide eye is restrained against free swinging movement with respect to the cable guide arm by a cam effective to shift the end of the cable guide arm and by a detent, both of which provide a measure of restraint, so that at all times the cable is laid properly.

With the foregoing considerations in mind, it is a principal object of this invention to provide an improved cable guide for a vehicle supplied with power from a fixed point.

Another object is to afford a construction for a cable guide for a mine vehicle or the like, wherein the shift in position of the supply cable incident to spooling thereof will be accommodated by the cable guide.

Other objects and important features of the invention will be apparent from a study of the description following taken with the drawings which together illustrate a preferred embodiment of the invention and what is now considered to be the best mode of practicing the principles thereof. Other embodiments of the invention will be suggested to those having the benefit of the teachings herein, and it is therefore intended that the scope of the invention not be limited by the precise embodiment herein shown, such scope being intended to be defined by the spirit and intent of the appended claims.

In the drawings:

Fig. 4 is a view similar to Fig. 3, but showing the positioning of the guide in paying out or taking up cable when the car is to the right of the junction box seen in Fig. 2;

Fig. 6 is an enlarged front elevation view looking from the right to the left as seen in Fig. 3.

Figure 1:
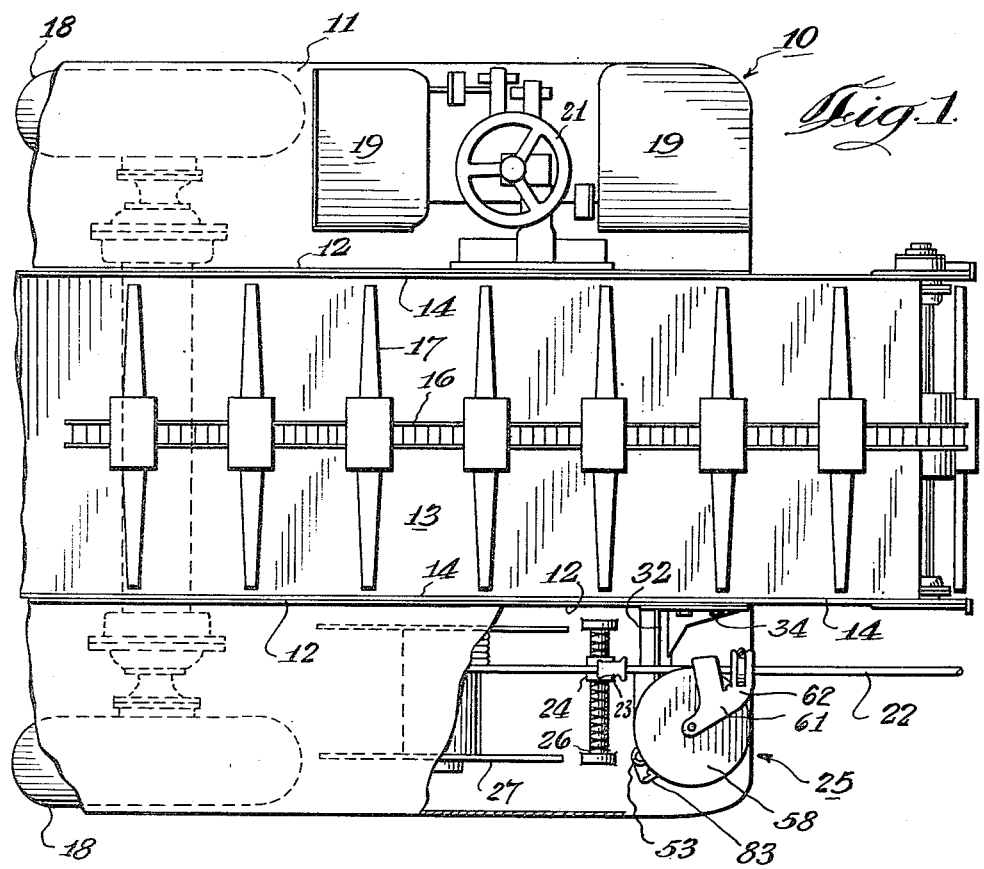
Fig. 1 is a plan view of a portion of a mine shuttle car, having embodied therewith the improved cable guide according to the present invention.
Figure 2:
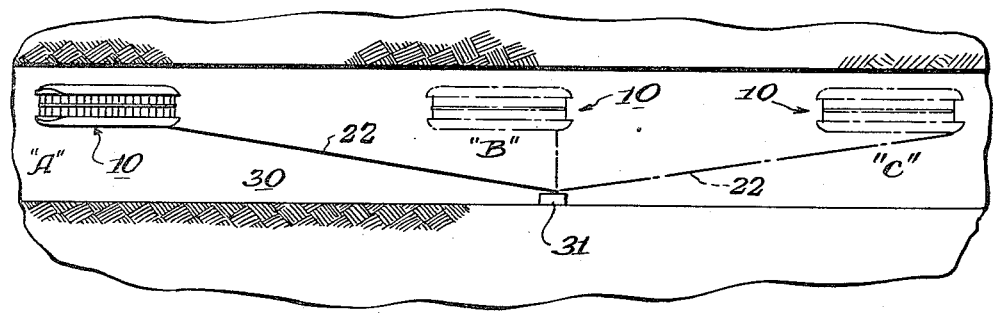
Fig. 2 is a schematic view of a shuttle car showing how the car moves with respect to a fixed power supply point or junction, and the manner in which the power supply cable is disposed during such movement.

Referring now particularly to Figs. 1 and 2 of the drawings, there is shown the discharge end of a mine vehicle or shuttle car indicated generally by the reference numeral 10. The car 10 comprises a frame structure 11 having laterally spaced side walls 12 which flank a flight conveyor bed 13 having side walls 14 in juxtaposition with the laterally spaced walls 12. A flight conveyor 16 having flights 17 is movable longitudinally of the bed 13, and the bed 13 together with the chain flight conveyor 16 is adapted to be moved up and down in a vertical plane by means, not shown, for discharge of the contents of the car onto a moving belt or other conveying medium. The shuttle car 10 is provided with front and rear dirigible steering wheels 18, a pair only of such wheels being shown. Said wheels are under the control of an operator occupying a seat 19, the vehicle being steered by a steering wheel 21 by the operator whilst occupying either of the seats 19.

Power is supplied to the vehicle 10 by a power supply cable 22 which is guided with respect to the vehicle 10 by a cable guide referred to generally by the reference numeral 25. The cable 22 is threaded through a guide eye 23 mounted on a nut 24 which travels to and fro on a spooler means 26 consisting of a reversing double lead screw. The cable 22 is layer wound upon a supply reel 27 by the spooler 26, the cable supply reel 27 being driven by any convenient means as for example a fluid motor, not shown, said fluid motor under certain conditions of operations acting as a pump to place a desired degree of tension upon the cable 22. The spooler means 26 is driven from the take up reel 27 so that the power cable 22 will be properly wound thereon.

The details of construction of such a shuttle car thus far described form no part of the present invention except as may be necessary to support the description and details of construction of the cable guide 25, and except as may be necessary to describe the functioning of the spooler means 26 in its cooperation with the cable guide 25.

Referring now particularly to Fig. 2, the shuttle car 10 is adapted to move back and forth in a mine room or entry 30, and the cable 22 is connected to a fixed power supply point or junction box 31. As the car moves from position A through position B to position C the cable is first taken up by the cable reel 27, and as the car moves through position B to position C, the cable 22 must change from the condition where it is taken up by the reel 27 to a condition where it is payed out by the reel 27. In so doing the cable 22 must at all times be kept free from crushing by the wheels 18 and also from snarling, and when the car is in the position to the right of the junction box 31 it must be payed out by the reel 27 and properly laid by the guide 25 in such a fashion as to lie off to one side of the car.

Conversely, when the car is moving from position C through position B to position A the cable must be first taken up by the supply reel 27 and then while the car 10 moves to the left of the position B must be payed out.

It is particularly to the problem of proper paying out and reeling in of the cable 22 that this invention is directed, the shifting in position of the cable guide 25 required during the travel to the various positions of the shuttle car and required during the operation of the spooler means 26 being interrelated, and at all times insuring the proper laying of the cable relative to the car 10.

Figure 3:
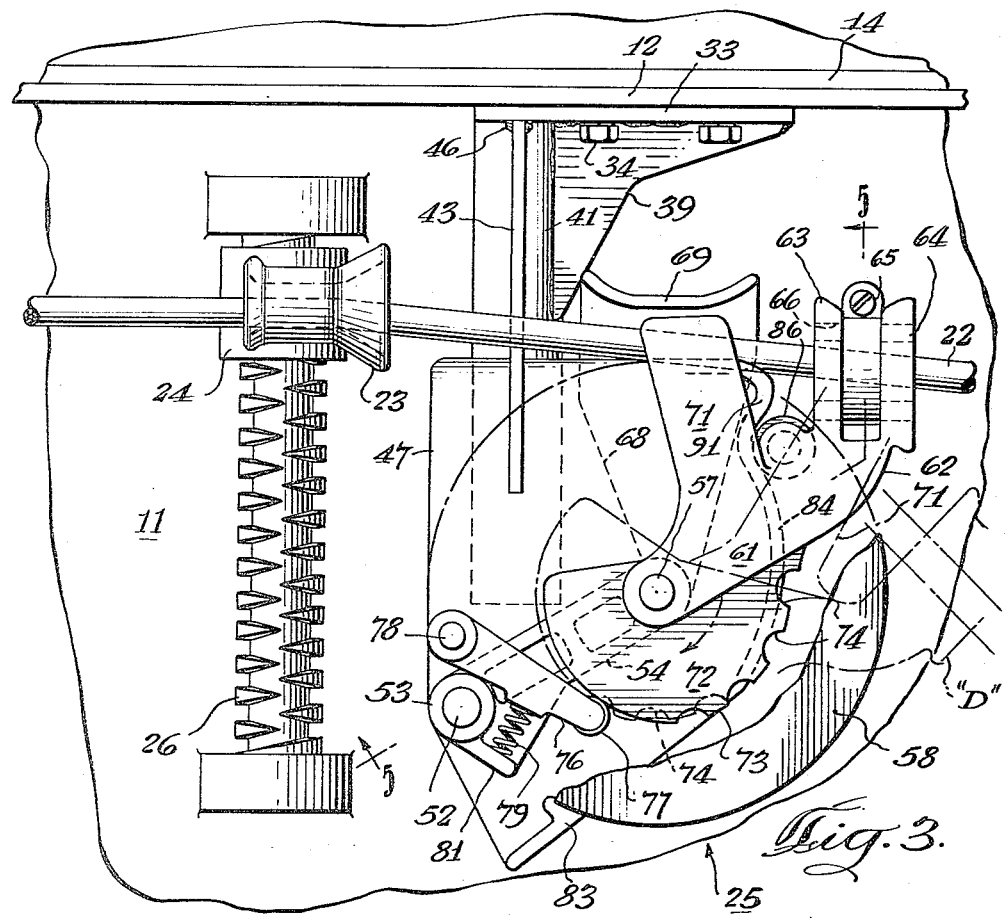
Fig. 3 is a plan view of a cable guide constructed in accordance with the present invention, the positioning of the guide being in accordance with the paying out or taking up of the cable when the shuttle car is to the left of the junction box seen in Fig. 2, certain of the parts being shown in phantom outline for purposes of clarity.
Figure 7:
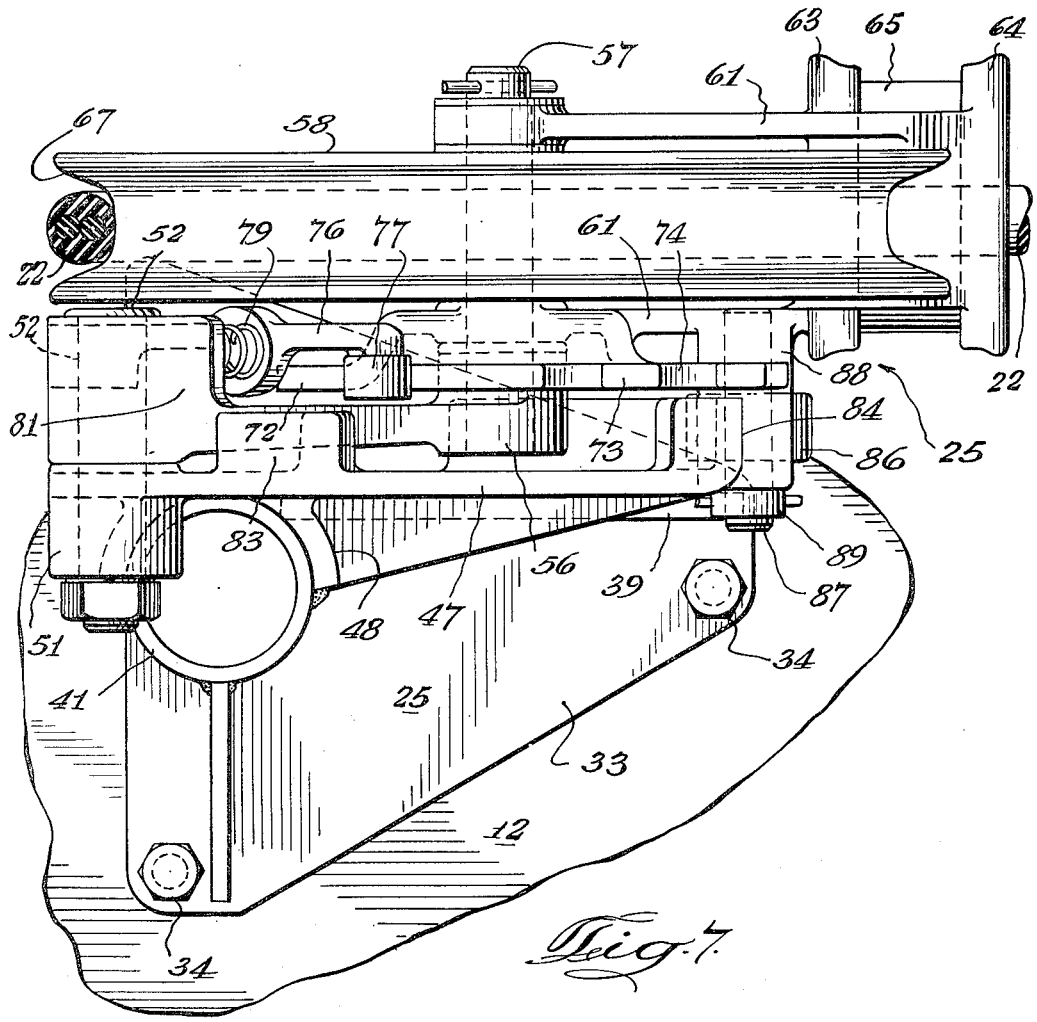
Fig. 7 is an enlarged side elevation view of the cable guide seen in Fig. 3.

Referring now particularly to Figs. 3 to 7 inclusive of the drawings, the cable guide 25 is mounted upon a tubular support arm 32 extending from and welded to a support plate 33 held by cap screws 34, see Figs. 3 and 7, to the outside of one of the laterally spaced walls 12. The tubular arm 32 is additionally supported by a vertical gusset plate 36 welded respectively at 37 and 38 to the underside of the tubular arm 32 and to the vertical plate 33. A horizontal gusset plate 39 is welded at 41 to the side of the tubular arm 32 and at 42 to the vertical support plate 33. As seen more particularly in Figs. 6 and 7, the tubular arm 32 is also supported by an upper gusset plate 43 welded at 44 to the upper side of the tubular arm 32 and at 46 to the vertical support plate 43.

A cable guide support and mounting 47 is supported on top of the tubular arm 32 and has an element 48, 48 of a generally cylindrical conformation conforming to the outer dimension of the tubular arm 32, the elements 48 being held in place to the arm 32 by weldments 49.

Figure 5:
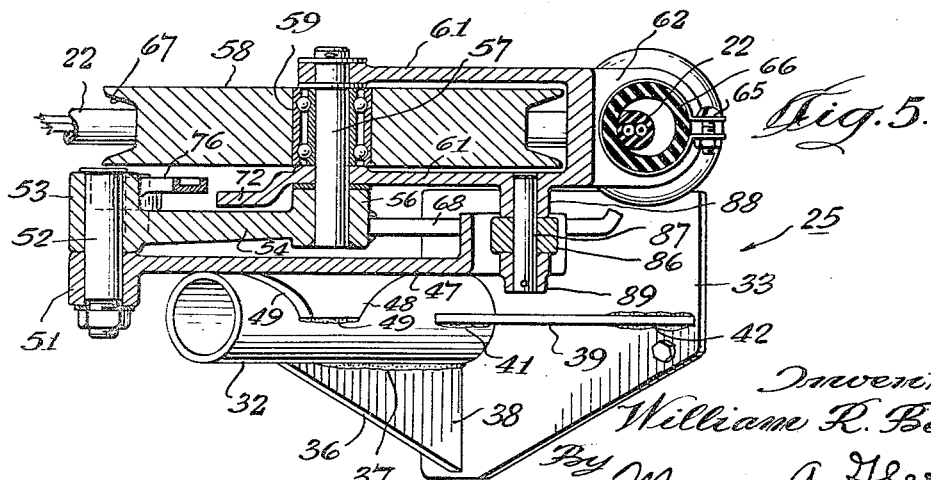
Fig. 5 is a section taken along the line 5—5 of Fig. 3 looking in the direction of the arrows.

Referring now to Fig. 5, a boss 51 extending downward from the support 47 is drilled to receive a pin 52 passing through a hub 53 of a cable sheave arm 54. The free end of the arm 54 has a drilled hub 56 for a vertical pin 57, and a cable sheave 58 is provided with a center bearing 59 supported on the vertical pin 57, and is positioned between spaced arms 61 of a cable guide arm 62. Each of said spaced arms 61 is formed integrally at the ends thereof with eyes 63 and 64 which are spaced from each other as seen more clearly in Figs. 3 and 4. The spaced eyes 63 and 64 form a support for a resilient guide eye 66 made of rubber or other resilient material and held in position by a clamp 65 encircling the guide eye 66 and having its edges contacting the inside faces of the spaced eyes 63 and 64.

It will be seen that the cable 22 is trained in a groove 67 of the sheave 58 and through the eye guide 66. The cable 22 is at times also supported to insure against its falling away from sheave 58, by a cable support arm 68 extending substantially at right angles from the cable sheave arm 54 and underneath the sheave 58. Said cable support arm 68 has an upturned flange 69 spaced a small distance from the periphery of the sheave 58 to provide a measure of clearance for the cable 22.

The cable 22 is also prevented from buckling up at times when the car is suddenly changed in its direction of movement which would result in the cable 22 being reversed in its direction also. The cable guide arm 62 thus has a cable hold down arm 71 extending from the upper spaced arm 61 and substantially at right angles thereto.

The cable support arm 68 and the cable hold down arm 71 are so disposed with reference to arms 54 and 68 respectively, that when the said arms 54 and 62 are in substantial alignment with respect to each other, the cable support arm 68 and cable hold down arm 71 are in spaced overlapping relationship.

As shown in Fig. 3, the cable 22 occupies the position shown when the car 10 is traveling toward the junction box 31 from the position A shown in Fig. 2 or away from junction box 31 toward position A. Should the direction of the vehicle 10 be reversed while between points A and B the apparatus thus far described will occupy substantially the position shown in Fig. 3, except for the influence thereon of the spooler means 26, which will be described in more detail as this specification proceeds.

As shown more particularly in Fig. 4, the cable 22 occupies the position shown when the car 10 is traveling between points B and C. More particularly, the cable 22 occupies such position when the car is traveling from position B towards position C; however, should the direction of the vehicle be reversed, i. e., to travel from position C to position B there normally would be a tendency of the cable guide arm 62 to move in a counter-clockwise direction with respect to the cable sheave arm 54, since a torque would be created about the vertical pin shaft 57 caused by the weight of the cable upon the cable guide eye 66. The torque so created would normally tend to cause the cable guide arm 62 to move in a counter-clockwise direction with respect to cable sheave arm 54, and the tendency for such movement would likewise tend to move cable 22 out of the groove 67 of sheave 58, but for the support arm 68 and flange 69, and cable hold down arm 71, and particularly when the cable reel 27 had not reversed its direction of rotation as rapidly as car 10 had reversed its direction of movement.

In order to prevent the tendency of the cable guide arm 62 to have such counter-clockwise movement upon the conditions just described, means are provided for releasably locking the cable guide arm 62 with respect to the cable sheave arm 54 in the position shown in Fig. 4. To this end the lower guide arm 61 is formed with a detent plate 72 with an arcuate periphery 73 having a center common with the vertical pin shaft 57. The periphery of the detent plate 72 has a plurality of evenly spaced substantially semi-circular notches 74 therein which cooperate with a detent arm 76 having a detent roller 77 on the end thereof. The detent arm 76 is pivoted on a boss 78 extending upward from the cable support mounting 47 and disposed a small distance from the boss 51 from which the cable sheave arm 54 extends.

The detent arm 76 is biased toward the detent plate 72 by a spring 79 held between the detent arm 76 and a stop 81 extending from the hub 53 of the cable sheave arm 54, the stop 81 being integral with the hub 53 and movable with the arm 54 as seen more clearly in Figs. 3 and 4.

Normally, the operation of the vehicle 10 past the junction box 31 in going through position B causes the cable sheave arm 54 to be turned on its pivot pin 52 from the position seen in Fig. 3 to a position against a stop 83 as seen in Fig. 4. The tension in the cable 22 by continued movement of the car 10 to the right causes the cable guide arm 62 to pivot in a clockwise direction with respect to the cable sheave arm 54 until the cable guide arm 62 is in position D as seen in Fig. 3 with the roller 77 engaged in one of the notches 74.

The cable guide arm 62 continues in such clockwise movement with respect to cable sheave arm 54 until the two arms are in the relative position as seen in Fig. 4, cable guide arm 62 at such time having in the meantime moved through positions as represented by the reference character E as seen in Fig. 4 to the position F, the detent roller 77 during such movement having occupied successive detent notches 74 on the detent plate 72.

Position E may be considered the relative position of the arms 54 and 62 as the vehicle 10 is moving past junction box 31 and is in position B.

The cable support arm 68 and the cable hold down 71 have meanwhile moved relative to each other so that the cable 22 is held against the groove 67 of the sheave 58. It is thus evident that upon reversal of the vehicle 10 at any point in its traverse between positions A and C, the cable 22 will be prevented from jumping away from the sheave 58.

Means are provided to enable the shifting of the cable sheave arm 54 and the cable guide arm 62 in accordance with the shift of the cable 22 by the spooler 26, and to impose at times a degree of restraint on the arms 54 and 62 during such spooling, thereby maintaining proper relationship of said arms. To this end the support and mounting 47 is provided with a vertical curved rib 84 affording a cam surface for a cam roller 86 turning on a pin 87 press fitted into a drilled boss 88 extending downward from the lower arm 61 of the cable guide arm 62, the roller 86 being held between the boss 88 and a stop collar 89 held to the pin 87 in any convenient manner.

As seen in Fig. 3, the curved rib 84 has a stop 91 thereon for the cam roller 86 which prevents the cable guide arm 62 from rotating further in a counterclockwise direction when cable sheave arm 54 is in the position shown in Fig. 3.

Consider the case when the spooler 26 is moving cable 22 toward the pin 52 supporting cable sheave arm 54 and the car 10 is moving between positions A and B as seen in Fig. 2. Such a condition is best seen with reference to Fig. 3, and imposes a radial thrust against pin 57 tending to pivot arm 54 around pin 52. This normally would cause collapse of the straight line relationship of arms 54 and 62, but the cam roller 86 coacting with curved rib 86 limits the amount of such collapse, and the arm 54 is thus moved against the stop 83 in accordance with the spooling movement, the cable guide arm 62 meanwhile moving in a counter-clockwise direction with respect to cable sheave arm 54.

Now consider the case when vehicle 10 is moving between positions B and C as seen in Fig. 2 and the cable 22 is being payed out in position alongside the vehicle 10 or is being reeled in from such position. Under such conditions, the cable guide according to the present invention is in position as seen in Fig. 4. The thrust (or the pull) imposed by the spooler 26 thus moves the cable sheave arm 54 about its pivot pin 52, the pull of the cable 22 against the cable guide arm 62 restraining to a degree the swinging of the arm 54. Under such condition of pivotal movement of the arm 54 during spooling (as for example in a direction to move arm 54 in a counter-clockwise direction as seen in Fig. 4) the cable guide arm 62 is enabled to move in a counter-clockwise direction with respect to the arm 54 to maintain the cable guide eye 64 in proper position to clear the side of the vehicle. The detent arm 76 and the detent notches 74 in such case of course impose restraint upon such movement of the cable guide arm 62, and the detent arm roller 77 will occupy successive detent notches 74 according to the relative position of the arms 54 and 62.

From the foregoing description of the invention, it will be apparent that a new and improved cable guide has been provided for the power supply cable of a mine vehicle or other type of vehicle supplied with power from a fixed point. The guide, in addition to providing for proper laying of the cable as it moves with respect to the junction box, also adopts positions in accordance with proper spooling of the cable.

While the invention has been described in terms of a preferred embodiment thereof it is not intended to be limited thereby, the invention being limited only by the scope and purview of the claims here appended.

I claim:

1. In a cable guide for a vehicle having a reeled supply cable which is connected to a source of power at a fixed point, spooler means for layer winding said cable upon a cable reel, a cable sheave arm pivotally mounted on said vehicle and having a cable sheave mounted at the free end thereof, a cable guide arm mounted on said cable sheave arm for pivotal movement with respect thereto, said cable guide arm being movable to a first position with respect to said cable sheave arm when said vehicle has moved to positions on one side of said fixed point and being movable to a second position with respect to said cable sheave arm when said vehicle has moved to positions on the other side of said fixed point, means for releasably locking said cable guide arm as said vehicle moves from a position on one side of said fixed point to a position on the other side of said fixed point, said cable sheave arm being displaced by the positioning of the cable along said spooler means, and said cable guide arm being movable with respect to said cable sheave arm in accordance with the displacement of said cable sheave arm.

2. A cable guide according to claim 1 wherein said arms are provided with cable support and cable hold down means effective to prevent the cable from leaving said sheave irrespective of the position of said cable sheave arm and said cable guide arm with respect to each other.

3. A cable guide according to claim 1 wherein the movement of said cable by said spooler means whilst the cable guide arm is in said first position causes said cable sheave arm to swing in one direction and said cable guide arm to swing in an opposite direction with respect to said cable sheave arm, and wherein means are provided to impose restraint upon said cable guide arm to control the last described swinging movement.

4. A cable guide according to claim 3 wherein said restraint imposing means comprises a fixed cam surface and a cam follower supported by said cable guide arm.

5. A cable guide according to claim 1 wherein the movement of said cable by said spooler means whilst the cable guide arm is in said second position causes said cable sheave arm to swing in one direction and said cable guide arm to swing in an opposite direction with respect to said cable sheave arm, and wherein means are provided to impose restraint upon said cable guide arm to control the last described swinging movement.

6. A cable guide according to claim 5 wherein said releasable locking means controls the swinging movement of said cable guide arm toward the said second position thereof.

7. In a cable guide for a vehicle having a reeled supply cable which is connected to a source of power at a fixed point, spooler means for layer winding said cable upon a cable reel, a cable sheave arm pivotally mounted on said vehicle and having a cable sheave mounted at the free end thereof, a cable guide arm mounted on said cable sheave arm for pivotal movement with respect thereto, said cable guide arm being movable to a first position with respect to said cable sheave arm when said vehicle has moved to positions on one side of said fixed point and being movable to a second position with respect to said cable sheave arm when said vehicle has moved to positions on the other side of said fixed point, said cable sheave arm being displaceable by the positioning of the cable by said spooler means, and said cable guide arm being movable with respect to said cable sheave arm in accordance with the displacement of said cable sheave arm.

8. A cable guide according to claim 7 wherein the movement of said cable by said spooler means whilst the cable guide arm is in said first position causes said cable sheave arm to swing in one direction and said cable guide arm to swing in an opposite direction with respect to said cable sheave arm, and wherein means are provided for imposing restraint upon said cable guide arm to control the last described swinging movement.

9. A cable guide according to claim 8 wherein said restraint imposing means comprises a cam roller and a cam.

10. A cable guide according to claim 8 wherein the movement of said cable by said spooler means whilst the cable guide arm is in said second position causes said cable sheave arm to swing in one direction and said cable guide arm to swing in an opposite direction with respect to said cable sheave arm, and wherein means are provided for imposing restraint upon said cable guide arm to control said swinging movement.

11. A cable guide according to claim 7 wherein the movement of said cable by said spooler means whilst the cable guide arm is in said second position causes said cable sheave arm to swing in one direction and said cable guide arm to swing in an opposite direction with respect to said cable sheave arm, and wherein means are provided for imposing restraint upon said cable guide arm to control the last described swinging movement.

12. A cable guide according to claim 11 wherein detent means are provided to control the swinging movement of said cable guide arm.

References Cited in the file of this patent

UNITED STATES PATENTS

| Number | Name | Date |
|---|---|---|
| 2,562,886 | Beck | Aug. 7, 1951 |